(12) United States Patent
Zhang et al.

(10) Patent No.: US 11,465,195 B2
(45) Date of Patent: Oct. 11, 2022

(54) HOT-FORGING DIE WITH CONFORMAL MESHY STRUCTURED CAVITY SURFACE LAYER AND PREPARATION METHOD THEREOF

(71) Applicants: Chongqing Jiepin Technology Co., Ltd, Chongqing (CN); Chongqing University, Chongqing (CN)

(72) Inventors: Jiansheng Zhang, Chongqing (CN); Jie Zhou, Chongqing (CN); Yuping Gan, Chongqing (CN); Qian Zhang, Chongqing (CN); Qiuyun Wang, Chongqing (CN); Lvfeng Yang, Chongqing (CN)

(73) Assignees: CHONGQING JIEPIN TECHNOLOGY CO., LTD, Chongqing (CN); CHONGQING UNIVERSITY, Chongqing (CN)

( * ) Notice: Subject to any disclaimer, the term of this patent is extended or adjusted under 35 U.S.C. 154(b) by 105 days.

(21) Appl. No.: 17/044,202

(22) PCT Filed: Jun. 13, 2019

(86) PCT No.: PCT/CN2019/091095
§ 371 (c)(1),
(2) Date: Sep. 30, 2020

(87) PCT Pub. No.: WO2020/232775
PCT Pub. Date: Nov. 26, 2020

(65) Prior Publication Data
US 2022/0134411 A1    May 5, 2022

(30) Foreign Application Priority Data
May 23, 2019   (CN) .......................... 201910434664.1

(51) Int. Cl.
*B23P 15/24* (2006.01)
*B21J 13/02* (2006.01)

(52) U.S. Cl.
CPC ............... *B21J 13/02* (2013.01); *B23P 15/24* (2013.01)

(58) Field of Classification Search
CPC ......... B23P 15/25; B23P 15/246; B23P 15/24; B21D 37/01; B21D 37/20; B21J 13/02; B21J 5/02; B21J 13/03
See application file for complete search history.

(56) References Cited

U.S. PATENT DOCUMENTS 3,677,060 A * 7/1972 Loqvist .................. B21D 37/01
                                                            228/124.1
9,302,310 B2 * 4/2016 Kiridena ................ B21D 37/16
(Continued)

FOREIGN PATENT DOCUMENTS

CN         1033167      5/1989
CN    200910104604.X A  8/2009
(Continued)

OTHER PUBLICATIONS

Translation DE 10214055 A1, Himmer et al. Dec. 2003.*
(Continued)

*Primary Examiner* — Edward T Tolan
(74) *Attorney, Agent, or Firm* — Hamre, Schumann, Mueller & Larson, P.C.

(57) ABSTRACT

The present disclosure discloses a hot-forging die with the conformal meshy structured cavity surface layer and a preparation method thereof. A large-scale hot-forging die includes a die substrate, and a sandwiched layer, a transition layer and a reinforcement layer are formed on the die substrate in sequence. The reinforcement layer and the transition layer are separated into a plurality of small units (Continued)

by the grooves. All the grooves are interconnected and communicated to form a meshy structure. The transition layer grooves are filled with ordinary soft material; the reinforcement layer grooves are filled with high temperature resistant soft material. The reinforcement layer material and the high temperature resistant soft material of the present disclosure cooperate with each other to obtain a cavity surface layer with properties of both hard and soft, strong and tough, which can fully release the large tensile stress that may occur on the surface of the die cavity during the welding process and under the service conditions of the die, so as to avoid hot cracks during welding process and service process.

6 Claims, 1 Drawing Sheet

(56) References Cited

U.S. PATENT DOCUMENTS

| | | | | |
|---|---|---|---|---|
| 9,597,725 | B2 * | 3/2017 | Sasaki | ............... B21K 5/20 |
| 2015/0040639 | A1 | 2/2015 | Sasaki et al. | |

FOREIGN PATENT DOCUMENTS

| | | | |
|---|---|---|---|
| CN | 101767268 A | 7/2010 | |
| CN | 101862916 A | 10/2010 | |
| CN | 104203450 | 12/2014 | |
| CN | 104589674 | 5/2015 | |
| CN | 104741499 A | 7/2015 | |
| CN | 106964950 | 7/2017 | |
| CN | 107151759 A * | 9/2017 | ............. C22C 38/02 |
| CN | 109158522 A | 1/2019 | |
| CN | 208421828 U | 1/2019 | |
| CN | 109676333 | 4/2019 | |
| DE | 10214055 A1 * | 12/2003 | ............... B32B 7/04 |
| JP | S57142727 | 9/1982 | |
| JP | S5881524 | 5/1983 | |
| JP | 2000301335 | 10/2000 | |
| JP | 2004167580 A | 6/2004 | |
| JP | 2006239770 A | 9/2006 | |

OTHER PUBLICATIONS

Translation CN 101862916 A, Univ Jilin, Oct. 2010.*
Translation CN 10471499 A Univ Chongqing, Jul. 2015.*
Translation CN 107151759 A, Shen et al. Sep. 2017.*
First Office Action issued for Chinese Patent Application No. 201910434664.1, dated Jan. 20, 2021, 13 pages including English translation.
Search Report issued for Chinese Patent Application No. 201910434664. 1, dated Jan. 20, 2021, 2 pages.

* cited by examiner

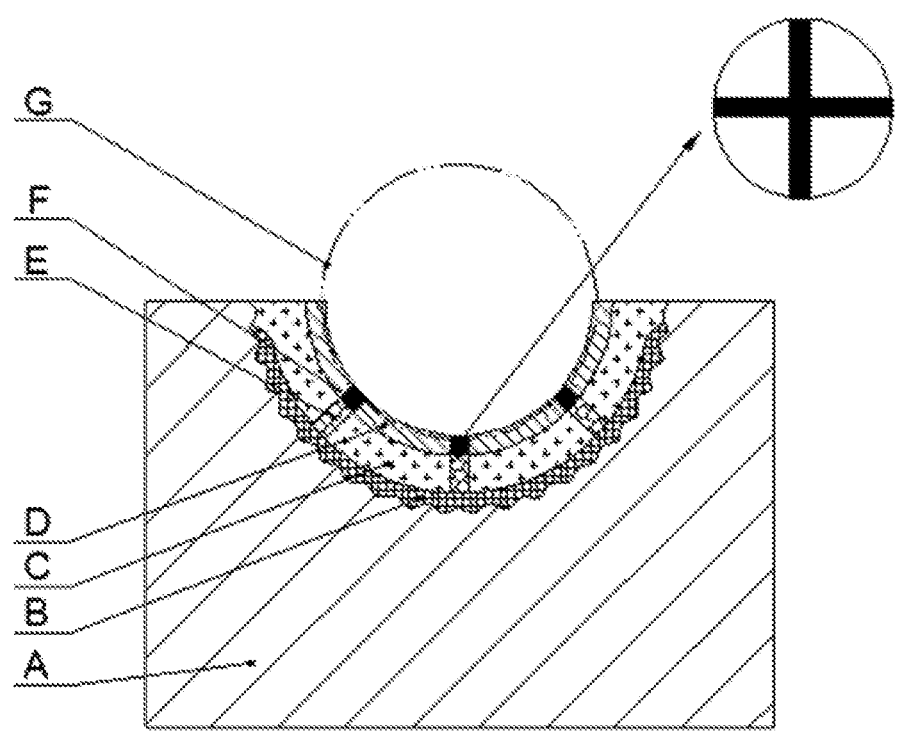

HOT-FORGING DIE WITH CONFORMAL MESHY STRUCTURED CAVITY SURFACE LAYER AND PREPARATION METHOD THEREOF

TECHNICAL FIELD

The present disclosure relates to large-scale hot-forging dies, in particular to a hot-forging die with a conformal meshy structured large-scale cavity surface layer and a preparation method thereof, which belong to the technical field of dies.

BACKGROUND

With the rapid development of China's national strategic demand fields such as aerospace, nuclear power, petrochemical and the like, the demand for large-scale, integrated, and precise high-performance key components is increasing. The processing of these components often involves large-scale forging dies. The processing objects of the large-scale forging die and the complex and harsh environment faced in the processing often result in a very low service life of the forging die and a very high cost. Chinese Invention Patent No. ZL200910104604X with the title of "Preparation method of forging die by bimetallic layer surfacing on cast steel matrix" and Chinese Invention Patent No. ZL 201510171656.4 with the title of "Forging die with sandwiched layer and preparation method of forging die sandwiched layer by surfacing" have solved the problems of high production cost and low service life of the large-scale forging dies to a certain extent. In Chinese Patent No. ZL 201510171656.4, a sandwiched layer is provided between the cast steel substrate and the transition layer. The sandwiched layer has a better plasticity and a lower yield strength than that of the cast steel substrate and the transition layer. When the die is subjected to high-pressure stress, the sandwiched layer can serve as a cushion between the transition layer and the cast steel substrate, such that the stress is more uniformly distributed on the cast steel substrate layer, the high-pressure peak stress can be quickly diffused and weakened, and the peak stress value undertaken by the cast steel substrate can be reduced to avoid cracks in the cast steel substrate directly caused by peak stress, which may lead to fracture and failure of the die, thereby improving the pressure-bearing safety of the cast steel substrate, and increasing the pressure-hearing capacity of the die with sandwiched layer and the overall safety performance. Although the aforementioned patents solve the problems of service life and pressure resistance to a certain extent, because large-scale forging dies often involve the processing of difficult-to-deformation materials, with the increase of the production, after producing dozens of forgings using difficult-to-deformation materials by the large-scale forging die, many elongated irregular cracks still appear on the surface layer of the cavity, which will affect the service life of the large-scale forging die, safe production of the forging, high-end equipment manufacturing costs, and international competitiveness. Solving these cracks is a new bottleneck that need to be resolved urgently in the production of large-scale die forgings. The reason of the cracks is that, since the cavity area of forging dies manufactured by traditional methods in the world is large, in some stages before and after service, such as surfacing stages during die manufacturing, high temperature stages when the die is put into use to produce components, the temperature stress of these stages is very large, which results in a large number of cracks in different degrees on the surface of the forging die cavity after a long time of use.

SUMMARY

In view of the shortcomings of being prone to cracks on the surface layer of the conventional large-scale forging die cavity, an object of the present disclosure is to provide a large-scale hot-forging die with a conformal meshy structured cavity surface layer and a preparation method thereof. The large-scale forging die can well prevent the formation and expanding of the cracks on the surface layer of cavity, thus improving the service life of forging dies.

The technical solution of the present disclosure is achieved as follows.

A hot-forging die with a conformal meshy structured cavity surface layer includes a die substrate, a sandwiched layer, a transition layer and a reinforcement layer are formed on the die substrate in sequence. The reinforcement layer is divided into a plurality of small units that are separated from each other via constructing reinforcement layer grooves. All of the reinforcement layer grooves are interconnected and communicated to form a meshy structure, and the reinforcement layer grooves are filled with a high temperature resistant soft material.

Further, the transition layer is divided into a plurality of small units separated from each other via constructing transition layer grooves, all of the transition layer grooves are interconnected and communicated to form a meshy structure, and the transition layer grooves are filled with an ordinary soft materials; all of the transition layer grooves and the reinforcement layer grooves are completely aligned up and down.

The ordinary soft material has a hardness of HRC 10-30, and mechanical properties at normal temperature are: yield strength σs≥550 MPa, tensile strength σb≥750 MPa, elongation δ≥14.7%, shrinkage Ψ≥31.2%, impact energy Akv≥30 J, compressive strength at 400° C.≥550 MPa; the high temperature resistant soft material has a hardness of HRC 20-35, mechanical properties at room temperature are: yield strength σs≥700 MPa, tensile strength σb≥980 MPa, elongation δ≥16.6%, shrinkage Ψ≥31.5%, impact energy Akv≥35J, compressive strength ≥500 MPa at 600° C.

A preparation method of the aforementioned hot-forging die with the conformal meshy structured cavity surface layer includes the following steps:

1) casting a die substrate to be welded by using a cast steel as a die substrate material; a surfacing allowance is reserved in a cavity portion;

2) surfacing a sandwiched layer welding material with good plasticity and low yield strength on the cast die substrate to be welded of step 1) along a shape of a reserved surfacing part;

3) surfacing a transition layer welding material with higher strength and higher hardness on the die substrate welded with the sandwiched layer along the shape of the reserved surfacing part allowance and a shape of the sandwiched layer, the sandwiched layer welding material is completely covered and wrapped by the transition layer welding material, continuing to weld to a pre-designed thickness below a profile of a die cavity;

4) processing a corresponding transition layer groove meshy structure on the die substrate welded with the transition layer of step 3) according to a pre-designed transition layer groove meshy structure; a depth of the transition layer groove corresponds to a thickness of the transition layer;

5) surfacing and filling the transition layer groove of step 4) using the ordinary soft material with good plasticity and high elongation, a filling thickness is consistent with the thickness of the transition layer, such that a surface of the ordinary soft material is coplanar with a surface of the transition layer;

6) surfacing a reinforcement layer welding material with a high-temperature wear-resistance on the surface of the transition layer and the ordinary soft material of step 5), the reinforcement layer welding material covering a main wear-resistant working area or all wear-resistant area of the die, and welding to a pre-designed thickness on the profile of the cavity;

7) processing a corresponding reinforcement layer groove meshy structure on the die substrate welded with the reinforcement layer of step 6) according to a pre-designed reinforcement layer groove meshy structure, a depth of the reinforcement layer groove corresponds to a thickness of the reinforcement layer;

8) surfacing and filling the reinforcement layer groove of step 7) with the high temperature resistant soft material, a filling thickness is consistent with the thickness of the reinforcement layer, such that a surface of the high temperature resistant soft material is coplanar with a surface of the reinforcement layer; and 9) performing a tempering and slow cooling process, a mechanical processing and other post-treatment steps to the die obtained in step 8), so as to obtain the large-scale hot-forging die with the conformal meshy structured cavity surface layer according to claim 2.

It is also possible to construct the grooves in one time after the transition layer and the reinforcement layer are surfaced, and then the grooves are filled separately. The specific method is as follows:

1) casting a die substrate to be welded by using a cast steel as a die substrate material; a surfacing allowance is reserved in a cavity portion;

2) surfacing a sandwiched layer welding material with good plasticity and low yield strength on the cast die substrate to be welded of step 1) along a shape of a reserved surfacing part;

3) surfacing a transition layer welding material with higher strength and higher hardness on the die substrate welded with the sandwiched layer along the shape of the reserved surfacing part allowance and a shape of the sandwiched layer, the sandwiched layer welding material is completely covered and continuing to weld to a pre-designed thickness below a profile of a die cavity;

4) surfacing a reinforcement layer welding material with a high-temperature wear-resistance on the surface of the transition layer welding material of step 3), covering a main wear-resistant working area or all wear-resistant area of the die, and welding to the pre-designed thickness on the profile of the cavity;

5) processing a corresponding meshy groove structure according to a pre-designed meshy groove structure on the die substrate of step 4); a depth of the groove reaches the surface of the sandwiched layer welding material;

6) first surfacing and filling the meshy groove structure of step 5) with the ordinary soft material with a good plasticity and a high elongation, a filling thickness of the ordinary soft material is consistent with a thickness of the transition layer, such that a surface of the ordinary soft material is coplanar with a surface of the transition layer; then surfacing and filling with a high temperature resistant soft material, a filling thickness of the high temperature resistant soft material is consistent with a thickness of the reinforcement layer, so that a surface of the high temperature resistant soft material is coplanar with a surface of the reinforcement layer;

7) performing a tempering and slow cooling process, a mechanical processing and other post-treatment steps to the die obtained in step 6), so as to obtain a large-scale hot-forging die with a conformal meshy structured cavity surface layer according to claim 2.

Compared with the prior art, the present disclosure has the following beneficial effects:

In the present disclosure, by conformally constructing grooves with certain widths on a surface layer of a large-scale die cavity (all grooves are interconnected and communicated to final mesh grooves), the die cavity with a large area surface layer is divided into small-area cavities, such that the unordered cracks are constructed into ordered mesh grooves, and then the mesh grooves are filled with soft material. The filled meshy soft material with high elongation and the blocky hard material of the reinforcement layer with high-temperature resistance and deformation-resistance cooperate with each other to obtain a cavity surface layer with properties of both hard and soft, strong and tough. The constructed ordered meshy groove and the filled soft material can fully release the large tensile stress that may occur on the surface of the die cavity during the welding process and in the future die service conditions, thus effectively avoiding the formation and expansion of cracks, extending the service life of large-scale forging dies, and therefore solving the problems proactively instead of coping passively.

BRIEF DESCRIPTION OF THE DRAWINGS

FIG. 1 is a schematic cross-sectional view of a forging die of the present disclosure;

In the FIGURE, A is a die substrate; B is a sandwiched layer; C is a transition layer; D is a reinforcement layer; E is an ordinary soft material; F is a high temperature resistant soft material; G is a cavity profile.

DETAILED DESCRIPTION OF THE EMBODIMENTS

The cracks in the present disclosure are penetrating elongated cracks formed on a surface layer of a large-scale forging die cavity caused by alternating thermal stress. The cracks are not fatigue cracks or superficial cracks, such that conventional solutions based on fatigue cracks or superficial cracks are not suitable for the large-scale forging die. In order to fundamentally solve the problem of formation and expansion of elongated cracks, after analyzing the formation mechanism of the cracks, an idea of mesh configuration, referred to as mesh configuration (the meshy soft material with high elongation and the blocky hard material with high-temperature resistance and anti-deformation cooperate with each other to obtain a cavity surface layer with properties of both hard and soft, strong and tough) is specifically proposed in the present disclosure.

The specific implementation structure can be referred in FIG. 1. It can be seen from the FIGURE that, a large-scale hot-forging die with a conformal meshy structured cavity surface layer of the present disclosure includes a die substrate A. A sandwiched layer B, a transition layer C, and a reinforcement layer D are formed on the die substrate A in sequence. The reinforcement layer D is divided into a plurality of small units that are separated from each other via reinforcement layer grooves. All of the reinforcement layer grooves are interconnected and communicated to form a meshy structure, and the reinforcement layer grooves are filled with a high temperature resistant soft material F. The reinforcement layer material and the high temperature resistant soft material of the present disclosure cooperate with each other to obtain a cavity surface layer with properties of both hard and soft, strong and tough, which can fully release the large tensile stress that may occur on the surface of the die cavity during the welding process and under the service conditions of the die.

During the forging process of a material that is difficult to be deformed, the service temperature of the transition layer is still very high. If the grooves are only provided and filled on the reinforcement layer, thermal stress accumulation may cause the internal cracks to appear. Accordingly, in order to achieve a better effect of preventing the appearance of surface layer cracks, the transition layer C of the present disclosure is divided and grooves are filled in the same way according to the concept of the reinforcement layer, that is, the transition layer C is divided into a plurality of small units separated from each other via transition layer grooves, all of the transition layer grooves are interconnected and communicated to form a meshy structure, and the transition layer grooves are filled with ordinary soft materials E. All of the transition layer grooves and the reinforcement layer grooves are completely aligned up and down.

The location of the grooves is generally based on the groove area of the die cavity and the statistical data of the crack occurrence area during the actual service process of the same type of die, that is, the main principle is to configure the grooves according to the appearance paths of cracks. Specifically, it only requires to configure intervals with reasonable sizes and positions (related to the die cavity size); the width is about 5 mm (considering the convenience and effect of processing). There is no special requirement for the shape of the groove. Generally, the shape of the groove after gouging is a semi-circular cross section of a fish scale.

The ordinary soft material E has a hardness of HRC 10-30, and the mechanical properties at normal temperature are: yield strength $\sigma_s \geq 550$ MPa, tensile strength $\sigma_b \geq 750$ MPa, elongation $\delta \geq 14.7\%$, shrinkage $\Psi \geq 31.2\%$, impact energy Akv$\geq 30$ J, compressive strength at 400° C. (operating temperature) $\geq 550$ MPa; the high temperature resistant soft material F has a hardness of HRC 20-35; the mechanical properties at room temperature are: yield strength $a_s \geq 700$ MPa, tensile strength $\sigma_b \geq 980$ MPa, elongation $\delta \geq 16.6\%$, shrinkage $\Psi \geq 31.5\%$, impact energy Akv$\geq 35$ J, compressive strength at 600° C. (operating temperature)$\geq 500$ MPa. Under the premise that the working temperature is not higher than 500° C. (such as the forging die for forming aluminum alloy forgings, the maximum temperature of the surface layer of the cavity is only about 400° C.), the same kind of soft material, that is, ordinary soft material E can be used. When the temperature is high (difficult-to-deformation materials, such as titanium alloy, high-temperature alloy, etc., the temperature of the surface layer of the cavity can reach 600-700° C.), if the reinforcement layer groove is still filled with ordinary soft materials, it will quickly collapse and deform, which is a more serious failure than cracks, such that the aforementioned requirements have achieved on the high temperature resistant soft material F filled in the reinforcement layer grooves in the present disclosure.

An improvement is made in the present disclosure based on the patent with a Patent number ZL 201510171656.4 and a title "a forging die with sandwiched layer and a preparation method for surfacing the forging die sandwiched layer". This patent introduces that the mechanical performance indexes of sandwiched layer B are: $\sigma_s$ yield strength $\geq 550$ MPa, $\sigma_b$ tensile strength $\geq 760$ MPa, $\delta$ elongation $\geq 14.7\%$, $\Psi$ shrinkage$\geq 31.2\%$, hardness is 30~35 HRC; preferably $\delta$ elongation of sandwiched layer B is 14.7%~20%, $\psi$ shrinkage is 31.2%-36%, $\sigma_s$ yield strength is 550~570 MPA. Mechanical performance indexes of the transition layer C are: $\sigma_s$ yield strength $\geq 790$ MPa, $\sigma_b$ tensile strength $\geq 1100$ MPa, $\delta$ elongation $\geq 11.7\%$, $\psi$ shrinkage $\geq 28.9\%$, hardness is 45~50 HRC; mechanical performance indexes of the strengthened layer D are: $\sigma_s$ yield strength $\geq 1000$ MPa, $\sigma_b$ tensile strength $\geq 1400$ MPa, $\delta$ elongation $\geq 9.6\%$, $\psi$ shrinkage $\geq 26.5\%$, hardness is 50~55 HRC. The aforementioned indicators are also suitable for the present application. In actual operation, the hardness of the sandwiched layer material used in the present disclosure can also be greatly reduced, to 10~30 HRC, the plastic index is basically unchanged, when the operating temperature is below 500° C., the sandwiched layer can be consistent with the ordinary soft material E. After a long-term industrialization test, the reinforcement layer material is actually changed to a cobalt-based superalloy material, and the hardness is moderate at room temperature (easy to machine to obtain accurate dimensions), and the reinforcement effect at high temperature can maintain good strength; the composition/organization transition between materials is good, and can achieve effective metallurgical integration.

In order to release the large alternating thermal tensile stress and other stresses on the surface layer of the large-scale forging die, the weld bevel should be filled with soft materials. In order to avoid the billet being pressed into the weld bevel area of the soft material layer during the high-temperature forming process of the die, a layer of soft material with high temperature resistance and a hardness greater than the ordinary soft material should be surfaced on the upper surface layer of the soft material layer, such that the gradient filling method of the meshy weld bevel is designed, and an optimal design and matching of the corresponding material are performed.

Since the creative contribution provided by the present disclosure over the prior art lies in the structure of the die of the present disclosure, rather than the selection of the shape and type of the forging die and the selection of the substrate material of the forging die, the following preparation methods in the present specific embodiment only enumerate a specific preparation method for a forging die, but the following steps should be considered suitable for different shapes and types of forging dies and various forging die substrate materials.

The aforementioned preparation method of the large-scale hot-forging die with the conformal meshy structured cavity surface layer includes the following steps:

1) a meshy structural design and a meshy groove (which can also be referred to as the weld bevel due to the need for surfacing filling material in the grooves) position design are performed on the surface layer of the forging die cavity using a simulation technology according to the stress and strain distribution of the forging die under working conditions.

2) A die substrate A to be welded is cast using a cast steel as a substrate material of the forging die, a surfacing allowance with a thickness of 20 mm is reserved at the cavity portion, and the cast die substrate is quenched and tempered.

3) On the basis of step 2), a sandwiched layer welding material with a good plasticity is surfaced at the reserved surfacing allowance part on the substrate A of the die to be welded along the pre-designed shape, and weld it to about 15 mm below a profile of the die cavity to obtain a sandwiched layer B.

4) On the basis of step 3), the transition layer material is surfaced on the die substrate welded with the sandwiched layer material and welded to about 5 mm below the profile of the die cavity to obtain a transition layer C.

5) On the basis of step 4), the material of the surface reinforcement layer is surfaced on the die substrate welded with the transition layer material, and welded to about 3 mm above the profile of the cavity to obtain a reinforcement layer D.

6) On the basis of step 5), meshy grooves are constructed in the gradient surfacing layer according to the meshy structural design requirements of step 1); the depth of the grooves reaches the surface of the sandwiched layer welding material.

7) On the basis of step 6), an ordinary soft material E is first surfaced and filled in the meshy groove, which is welded to be coplanar with the surface of the transition layer, and then the high temperature resistant soft material F is surfaced on the ordinary soft material E, and welded to be coplanar with the surface of the reinforcement layer.

8) After the surfacing, the forging die is tempered and then slowly cooled. The tempering temperature is 550V, and it is slowly cooled to 180° C. After slow cooling, the forging die is placed in the air and cooled to room temperature.

9) The forging die is mechanically processed after air cooling to make the size of each part of the forging die in place to produce the forging die required for actual production, G is the profile of the cavity finally obtained.

The aforementioned preparation process is to construct the groove after the surfacing both of the transition layer and the reinforcement layer, and then different or the same soft materials are filled in layer by layer as required. It is also possible to perform dividing and filling separately before filling an upper layer. That is, the transition layer is surfaced first, the transition layer groove is constructed, the transition layer groove is filled, the reinforcement layer is surfaced, the reinforcement layer grooves are constructed, and then the reinforcement layer grooves are filled. In the present disclosure, the groove (weld bevel) is generally constructed by means of gouging.

Compared with other forging die manufacturing technologies, the characteristics of the present invention include:

1) A new method for preparing a large-scale forging die with constructing a meshy structure on the gradient surface layer (reinforcement layer and transition layer) of the forging die cavity prepared from cast steel substrate is proposed in the present disclosure, which mainly includes a meshy structuring or partitions/blocks dividing design method, a meshy structural meshy structure, a blocky structural design method, and a meshy structural material optimization design and matching method.

2) In the present disclosure, the pre-designed meshy weld bevels are filled with a soft material with good plasticity and high elongation, and the soft material is allowed to be deformed to release the thermal stress of each surfacing block, which can effectively solve the problem of cracks on the surface layer of the large-scale forging die cavity.

3) When the present disclosure is applied to the manufacture of large-scale forging dies for forming a high-temperature hard-to-deformation material, the meshy weld bevels adopt the gradient combination of the ordinary soft material and the high-temperature resistant soft material, which can significantly enhance the high temperature resistance and anti-cracking ability of the dies, improve the service life of forging dies. When it is applied to the preparation of large-scale forging dies for material forming with a forming temperature below 500° C., the meshy weld bevel can be made of a single ordinary soft material, which can also significantly improve the service life of the forging dies.

4) The present disclosure enables the use of low-cost material as cast steel substrates, which can achieve the lightweight and low-cost manufacturing of large-scale forging dies.

5) The method of the present disclosure can be widely applied to the manufacture of forging dies, stamping dies, hemming machines, and large-scale dies and fixtures such as hemming dies and fixtures, and has a wide application value and development prospect in the field of green manufacturing.

The present disclosure can not only be used for the preparation of new dies, but is also suitable for the repairing and remanufacture of large-scale forging dies for forming difficult-to-deformation materials, which can significantly extend the service life of forging dies and prevent the formation and expansion of cracks. The present method allows the steel substrate of the die to be reused, which can save resources and recycle materials, meeting the requirements of national green manufacturing. The following is an example of repairing and remanufacture of a used die.

1) a meshy structural design and a mesh weld bevel position design are performed on the surface layer of the forging die cavity using a simulation technology according to the stress and strain distribution rule of the forging die under working conditions. The depth of the weld bevel is 25 mm below the surface of the forging die cavity, the cracks on the surface layer of the cavity is removed, and a surfacing allowance of 30 mm is reserved;

2) a layer of the sandwiched layer material with a height of 5 mm is surfaced on the surface of the forging die substrate to be repaired;

3) on the basis of step 2), a layer of the transition layer material with a height of 15 mm is surfaced on the surface of the sandwiched layer material;

4) on the basis of step 3), a layer of high temperature resistant reinforcement layer material with a height of 12 mm is also surfaced on the surface of the transition layer material, and 2 mm is the processing allowance;

5) on the basis of step 4), according to the design requirements of step 1), the transition layer material and the high temperature resistant strengthening layer material are constructed with a meshy weld bevel with a height of 27 mm;

6) on the basis of step 5), the meshy weld bevel is first surfaced and filled with an ordinary soft material with a height of 15 mm, then a layer of high temperature resistant soft material with a height of 12 mm is surfaced on the ordinary soft material, and 2 mm is the processing allowance;

7) the forged die is tempered after surfacing, the tempering temperature is 550° C., and the slow cooling temperature is 180° C. After slow cooling, the die is placed in the air for air cooling to room temperature;

8) a mechanical processing is performed on the cooled forging die to ensure the dimensional accuracy of each part, that is, to repair the forging die.

Finally, it should be noted that the aforementioned examples of the present disclosure are only examples for illustrating the present disclosure, rather than limiting the implementation of the present disclosure. Although the applicant has described the present disclosure in detail with reference to the preferred embodiments, for those who skill in the art, other different forms of changes and modifications can be made based on the above description. There is no way to exhaust all of the embodiments. Any obvious changes or alterations derived from the technical solutions of the present disclosure are still within the protection scope of the present disclosure.

What is claimed is:

1. A hot-forging die with a conformal meshy structured cavity surface layer, comprising a die substrate, wherein a sandwiched layer, a transition layer, and a reinforcement layer are formed on the die substrate in sequence,
the reinforcement layer is divided into a plurality of small units that are separated from each other via constructing reinforcement layer grooves,
all of the reinforcement layer grooves are interconnected and communicated to form a meshy structure, and
the reinforcement layer grooves are filled with a high temperature resistant soft material, wherein the high temperature resistant soft material has a hardness of HRC 20-35, and mechanical performances at room temperature are: yield strength σs≥700 MPa, tensile strength σb≥980 MPa, elongation δ≥16.6%, shrinkage Ψ≥31.5%, impact energy Akv≥35J, compressive strength at 600° C.≥500 MPa.

2. The hot-forging die with a conformal meshy structured cavity surface layer according to claim 1, wherein the transition layer is divided into a plurality of small units separated from each other via constructing transition layer grooves, and all of the transition layer grooves are interconnected and communicated to form a meshy structure, and the transition layer grooves are filled with an ordinary soft material; all of the transition layer grooves and the reinforcement layer grooves are completely aligned up and down, wherein the ordinary soft material has a hardness of HRC 10-30, and mechanical properties at normal temperature are: yield strength σs≥550 MPa, tensile strength σb≥750 MPa, elongation δ≥14.7%, shrinkage Ψ≥31.2%, impact energy Akv≥30J, compressive strength at 400° C.≥550 MPa.

3. A preparation method of the hot-forging die with the conformal meshy structured cavity surface layer according to claim 2, comprising the following steps:
1) casting a die substrate to be welded by using a cast steel as a die substrate material; wherein a surfacing allowance is reserved in a cavity portion;
2) surfacing a sandwiched layer welding material with a good plasticity and a low yield strength on the cast die substrate to be welded of step 1) along a shape of a reserved surfacing part;
3) surfacing a transition layer welding material with higher strength and higher hardness on the die substrate welded with the sandwiched layer along a shape of the reserved surfacing part allowance and a shape of the sandwiched layer, wherein the sandwiched layer welding material is completely covered and wrapped by the transition layer welding material, and continuing to weld to a pre-designed thickness below a profile of a die cavity;
4) processing a corresponding transition layer groove meshy structure on the die substrate welded with the transition layer of step 3) according to a pre-designed transition layer groove meshy structure, wherein a depth of the transition layer groove corresponds to a thickness of the transition layer;
5) surfacing and filling the transition layer groove of step 4) using the ordinary soft material with good plasticity and high elongation, wherein a filling thickness is consistent with the thickness of the transition layer, such that a surface of the ordinary soft material is coplanar with a surface of the transition layer;
6) surfacing a reinforcement layer welding material with a high-temperature wear-resistance on the surface of the transition layer and the ordinary soft material of step 5), the reinforcement layer welding material covering a main wear-resistant working area or all wear-resistant area of the die, and welding to a pre-designed thickness above the profile of the cavity;
7) processing a corresponding reinforcement layer groove meshy structure on the die substrate welded with the reinforcement layer of step 6) according to a pre-designed reinforcement layer groove meshy structure, a depth of the reinforcement layer groove corresponding to a thickness of the reinforcement layer;
8) surfacing and filling the reinforcement layer groove of step 7) with the high temperature resistant soft material, wherein a filling thickness is consistent with the thickness of the reinforcement layer, such that a surface of the high temperature resistant soft material is coplanar with a surface of the reinforcement layer; and
9) performing a tempering and slow cooling process, a mechanical processing, and other post-treatment steps to the die obtained in step 8), so as to obtain the large-scale hot-forging die with the conformal meshy structured cavity surface layer.

4. A preparation method of the hot-forging die with the conformal meshy structured cavity surface layer according to claim 2, comprising the following steps:
1) casting a die substrate to be welded by using a cast steel as a die substrate material; wherein a surfacing allowance is reserved in a cavity portion;
2) surfacing a sandwiched layer welding material with good plasticity and low yield strength on the cast die substrate to be welded of step 1) along a shape of a reserved surfacing part;
3) surfacing a transition layer welding material with higher strength and higher hardness on the die substrate welded with the sandwiched layer of step 2) along the shape of the reserved surfacing part allowance and a shape of the sandwiched layer, wherein the sandwiched layer welding material is completely covered and wrapped by the transition layer welding material, and continuing to weld to a pre-designed thickness below a profile of a die cavity;
4) surfacing a reinforcement layer welding material with a high-temperature wear-resistance on the surface of the transition layer welding material of step 3), covering a main wear-resistant working area or all wear-resistant area of the die, and welding to the pre-designed thickness above the profile of the cavity;
5) processing a corresponding meshy groove structure according to a pre-designed meshy groove structure on the die substrate of step 4), a depth of the groove reaching a surface of the sandwiched layer welding material;
6) first surfacing and filling the meshy groove structure of step 5) with the ordinary soft material with a good plasticity and a high elongation, wherein a filling thickness of the ordinary soft material is consistent with a thickness of the transition layer, so that a surface of the ordinary soft material is coplanar with a surface of the transition layer; then surfacing and filling with a high temperature resistant soft material, a filling thickness of the high temperature resistant soft material is consistent with a thickness of the reinforcement layer, so that a surface of the high temperature resistant soft material is coplanar with a surface of the reinforcement layer;

7) performing a tempering and slow cooling process, a mechanical processing and other post-treatment steps to the die obtained in step 6), so as to obtain a large-scale hot-forging die with the conformal meshy structured cavity surface layer.

5. The hot-forging die of claim 1, wherein the high temperature resistant soft material is softer than the reinforcement layer.

6. A hot-forging die with a conformal meshy structured cavity surface layer, comprising a die substrate, wherein a sandwiched layer, a transition layer, and a reinforcement layer are formed on the die substrate in sequence, the reinforcement layer is divided into a plurality of small units that are separated from each other via constructing reinforcement layer grooves, the reinforcement layer grooves are interconnected and communicated to form a meshy structure, and the reinforcement layer grooves are filled with a high temperature resistant soft material, wherein the high temperature resistant soft material has a hardness of HRC 20-35, and mechanical performances at room temperature are: yield strength $\sigma_s \geq 700$ MPa, tensile strength $\sigma_b \geq 980$ MPa, elongation $\delta \geq 16.6\%$, shrinkage $\Psi \geq 31.5\%$, impact energy $Akv \geq 35J$, compressive strength at 600° C. $\geq 500$ MPa, and the high temperature resistant soft material is softer than the reinforcement layer.

\* \* \* \* \*